US006959915B1

(12) United States Patent
Wald et al.

(10) Patent No.: US 6,959,915 B1
(45) Date of Patent: Nov. 1, 2005

(54) ATTACHMENT FOR A THROTTLE PLATE TO REDUCE SOUND

(75) Inventors: Benjamin C. Wald, Stillwater, OK (US); Rick D. Dobbs, Perkins, OK (US); Loren T. Powers, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 2 days.

(21) Appl. No.: 10/765,521

(22) Filed: Jan. 27, 2004

(51) Int. Cl.[7] ............................................. F16K 1/22
(52) U.S. Cl. ................. 251/305; 251/118; 137/625.31; 123/337
(58) Field of Search ............................ 251/305, 306, 251/307, 308, 118, 120, 121; 123/337; 137/625.28, 137/625.31

(56) References Cited

U.S. PATENT DOCUMENTS

| 3,176,704 A | * | 4/1965 | De Palma ................... 137/239 |
| 6,003,490 A | * | 12/1999 | Kihara et al. ............... 123/337 |
| 6,394,068 B1 | | 5/2002 | Palotay ........................ 123/337 |
| 6,602,099 B1 | | 8/2003 | Loberger et al. .............. 440/52 |
| 6,647,956 B1 | | 11/2003 | Sharpton .................. 123/339.1 |
| 6,758,458 B2 | * | 7/2004 | Ando et al. ................. 251/305 |
| 6,824,119 B2 | * | 11/2004 | Conley et al. .............. 251/305 |

OTHER PUBLICATIONS

U.S. Appl. No. 10/224,267, filed Aug. 20, 2002, Conley et al.
U.S. Appl. No. 10/104,232, filed Mar. 22, 2002, Elliot et al.
U.S. Appl. No. 10/256,291, filed Apr. 17, 2003, Ha.

* cited by examiner

Primary Examiner—Edward K. Look
Assistant Examiner—John K. Fristoe, Jr.
(74) Attorney, Agent, or Firm—William D. Lanyi

(57) ABSTRACT

A block of material is attached to a surface of a throttle plate in a throttle body assembly for the purpose of reducing sound emanating from the throttle plate region. The block of material has a first edge attached proximate to a perimeter of the throttle plate and second edge disposed more proximate the pivot axis of the throttle plate. The block of material is formed to have a central region and two distal regions. The distal regions are hyperbolic in shape and taper toward the outer edges of the block of material. Two holes are formed through the block of material.

18 Claims, 3 Drawing Sheets

ATTACHMENT FOR A THROTTLE PLATE TO REDUCE SOUND

BACKGROUND OF THE INVENTION

1. Field of the Invention

The present invention is generally related to a throttle body assembly and, more particularly, to a block of material attached to a throttle plate for the purpose of reducing the sound generated by air passing through the throttle body structure.

2. Description of the Prior Art

Those skilled in the art of throttle bodies and, more particularly, throttle bodies used in marine propulsion systems are familiar with a problem that is inherent in certain throttle body structures. As air flows through the cylindrical conduit of a throttle body, past the throttle plate, sound is generated. This sound can be irritating to passengers on a marine vessel that is powered by the marine propulsion system. Those skilled in the art are also familiar with many different techniques used to address this problem of irritating noise and other forms of vibration relating to throttle bodies.

U.S. Pat. No. 6,647,956, which issued to Sharpton on Nov. 18, 2003, discloses a sound attenuating system for a marine engine. A sound attenuator is provided for an idle air control valve system in order to reduce noise emanating from the idle air control valve. The sound attenuator comprises a fibrous pad that is inserted into an air conduit of the idle air control system. In a preferred embodiment, the fibrous pad is inserted into the air conduit near the air inlet where the conduit receives air from a region upstream, or above the throttle plate. A small hole can be provided through the air inlet. In certain embodiments, the air inlet of the air conduit is an opening formed in an inner cylindrical surface of the throttle body. In alternative embodiments, the air inlet can be remote from the internal surface of the throttle body.

U.S. patent application Ser. No. 10/224,267, which was filed on Aug. 20, 2002 by Conley et al., disclosed a throttle plate having reduced air rush noise and method. A throttle body for use in the air intake system of a motor vehicle comprising a throttle body defining a throttle bore is described. The throttle plate is rotatably mounted within the throttle bore, having an outside diameter smaller than an inside diameter of the throttle bore. A plurality of fins, located on the throttle plate, extend from the throttle plate in a direction generally perpendicular to a plane defined by the throttle plate. The fins are optimized in number, thickness, spacing, length, shape, and angle to reduce air-rush noise without impacting engine performance.

U.S. patent application Ser. No. 10/104,232, which was filed on Mar. 22, 2002 by Elliott et al., describes a throttle plate wedge. A throttle plate assembly with a wedge for limiting air flow upon initial acceleration is described.

U.S. patent application Ser. No. 10/256,291, which was filed on Sep. 26, 2002 by Ha, describes a throttle apparatus. Air induction noise of a throttle apparatus caused by interference between flowing air and an opening for a bypass passage is reduced because a protrusion formed on an interior surface of the throttle apparatus changes aerodynamic features of the throttle apparatus.

U.S. Pat. No. 6,394,068, which issued to Palotay on May 28, 2002, describes a throttle shaft and plate assembly. A throttle assembly includes a throttle plate that is mounted for rotation with a throttle shaft. A first set of ribs is formed along a portion of the throttle shaft and a second set of ribs is formed along one side of the throttle plate. The throttle shaft includes a D-shaped boss that is received within a D-shaped opening in the throttle plate to properly locate the plate to the shaft. When the plate is properly positioned, the second set of ribs is positioned transversely with respect to the first set of ribs and abuts against the first set of ribs. Weld energy is supplied along the length of the rib interface to secure the plate to the shaft.

U.S. Pat. No. 6,602,099, which issued to Loberger et al. on Aug. 5, 2003, discloses a vibration isolation support structure for a throttle body. An isolation mounting system is provided for the purpose of supporting a throttle body structure which is completely supported by an elastomeric support, but is held in noncontact association with an air intake manifold in order to effectively isolate the throttle body structure from vibration. This isolation protects potentially delicate components contained within a component housing that is rigidly attached to the throttle body structure.

The patents described above are hereby expressly incorporated by reference in the description of the present invention.

As air rushes past the edge of a throttle plate, when the throttle plate is partially opened, annoying and irritating sounds can be generated. It would therefore be significantly beneficial if a simple and inexpensive method could be provided that is effective in reducing the overall magnitude of irritating noise emanating from a throttle body structure when air is flowing past a partially opened throttle plate.

SUMMARY OF THE INVENTION

A throttle body assembly, made in accordance with a preferred embodiment of the present invention, comprises a throttle plate supported by a generally cylindrical throttle body conduit for rotation about a pivot axis. The throttle plate is rotatable into a plurality of partially opened positions to allow air flow through the throttle body assembly and is also rotatable into a generally closed position to inhibit air flow through the throttle body assembly. The throttle plate has a first generally semicircular half at a first side of the pivot axis and a second generally semicircular half at a second side of the pivot axis. The first generally semicircular half is rotatable toward an upstream side of the throttle body assembly to place the throttle plate in one of the plurality of partially open positions. The second generally semicircular half is rotatable toward a downstream side of the throttle body assembly.

A preferred embodiment of the present invention further comprises a block of material that is attached to the second generally semicircular half of the throttle plate. The block of material has a first major surface and a second major surface. The first major surface is disposed in contact with a surface of the second generally semicircular half of the throttle plate. The second major surface extends away from the surface of the second generally semicircular half of the throttle plate. The block of material has a first edge formed in the shape of an arc of a circle and a second edge which circumscribes the first major surface in combination with the first edge. The first edge is disposed in contact with the second generally semicircular half of the throttle plate proximate a generally semicircular perimeter of the throttle plate. The block of material is generally symmetrical about a plane which is generally perpendicular to the pivot axis. The line divides the block of material into a first side and a second side. The block of material has a central region of the second major surface disposed between first and second distal regions of the second major surface. The thickness of the first and second distal regions, as measured between the first and second major surfaces, decreases as a function of the distance from the central region.

In a particularly preferred embodiment of the present invention, the thickness of the central region, as measured between the first and second major surfaces, also decreases as a function of the distance from the first edge in a direction toward the second edge.

A first hole extends through the block of material in a direction which is generally perpendicular to the pivot axis. A second hole can also extend through the block of material in a direction which is generally perpendicular to the pivot axis. The first hole extends through the first edge and through the second major surface. Similarly, the second hole extends through the first edge and through the second major surface. The first and second holes are symmetrically located relative to, and on opposite sides of, the line that is perpendicular to the pivot axis.

The block of material is attached to an upstream surface of the throttle plate in a preferred embodiment of the present invention. The first and second distal regions of the second major surface are each generally hyperbolic in shape to decrease the thickness of the first and second distal regions as a generally hyperbolic function, as measured between the first and second major surfaces, decreasing as a function of the distance from the central region.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
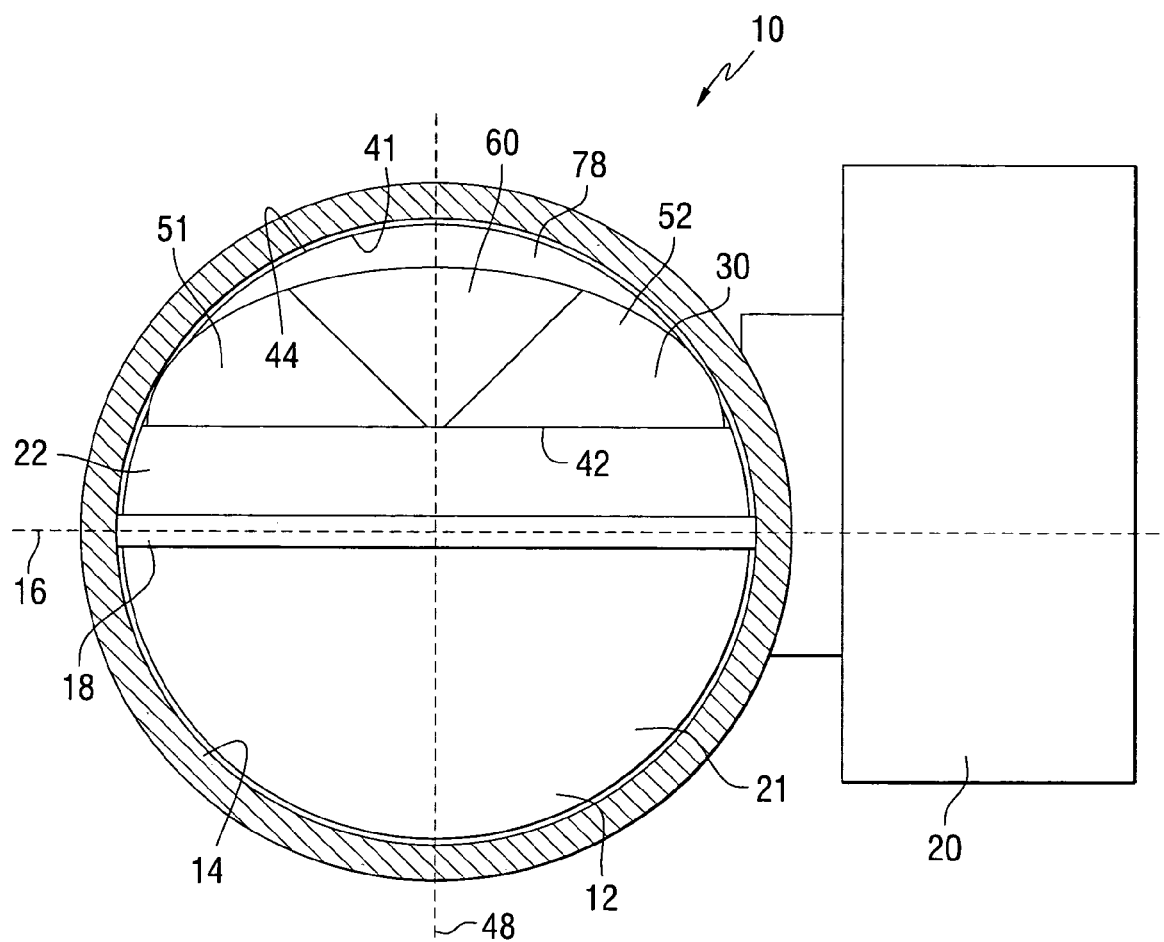
FIG. 1 shows the present invention attached to a throttle plate of a throttle body assembly.

Throughout the description of the preferred embodiment of the present invention, like components will be identified by like reference numerals.

FIG. 1 illustrates a throttle body assembly made in accordance with a preferred embodiment of the present invention. It should be understood that FIG. 1 is intentionally drawn as a simplified schematic representation to illustrate the location of certain basic components of the throttle body assembly and, more particularly, of certain features of the present invention. A throttle plate 12 is supported by a generally cylindrical throttle body conduit 14 for rotation about a pivot axis 16. Typically, a pivot rod 18 is supported by the throttle body conduit 14 in such a way that the throttle plate 12 is free to rotate about the pivot axis 16 in response to torque provided by a stepper motor 20 or a similar mechanical device. The precise mechanism used to rotate the throttle plate 12 about the pivot axis 16 is not limiting to the present invention.

The throttle plate 12 is rotatable about the pivot axis 16 into a plurality of partially opened positions which allow air flow through the throttle body assembly 14 in a manner that is well known by those skilled in the art. The throttle plate 12 has a first generally semicircular half 21 at a first side of the pivot axis 16 and a second generally semicircular half 22 at a second side of the pivot axis 16. The first generally semicircular half 21 is rotatable toward an upstream side of the throttle body assembly 14 to place the throttle plate 12 in one of the plurality of partially opened positions. The second generally semicircular half 22 of the throttle plate 12 is rotatable toward a downstream side of the throttle body assembly 14 from the generally closed position, similar to the position illustrated in FIG. 1. When rotated about the pivot axis 16, the second generally semicircular half 22 moves downward into the page of the illustration and the first generally semicircular half 21 moves upward away from the page of the illustration. In other words, the throttle plate 12 rotates about the pivot axis 16 in a clockwise direction when viewed in a direction from the stepper motor housing 20. A block of material 30 is attached to the second generally semicircular half 22 of the throttle plate 12. The specific shape of the block of material 30 will be described in greater detail below in conjunction with FIGS. 2–6.

Figure 3:
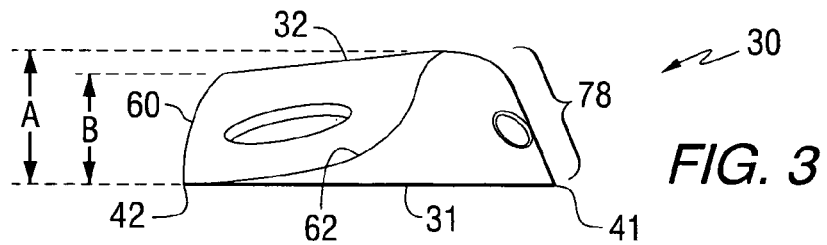
FIG. 3 is a side view of the present invention.
Figure 2:
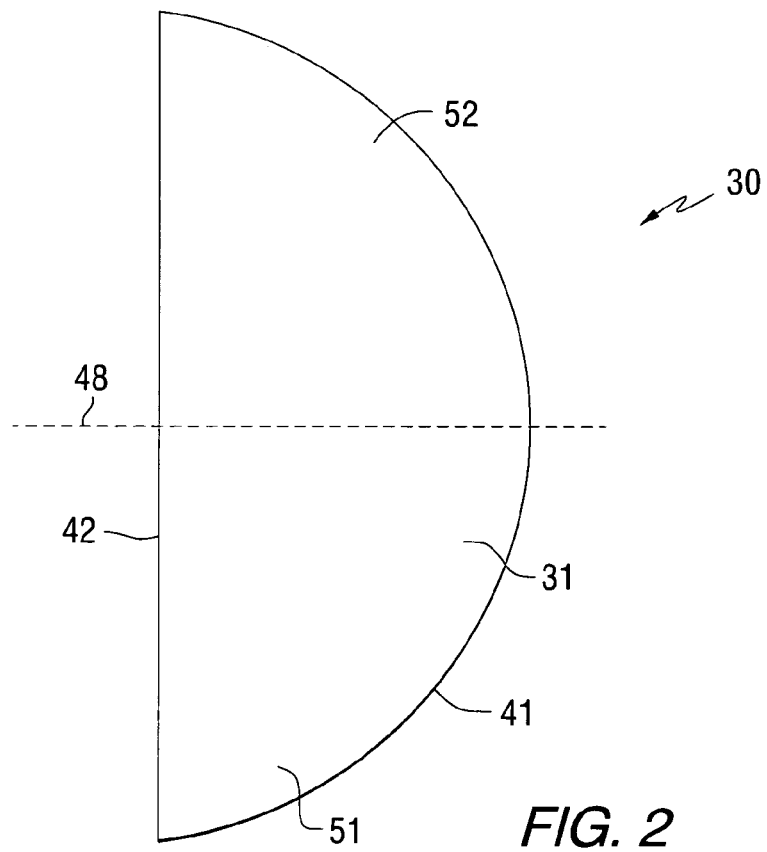
FIG. 2 shows a bottom view of the block of material of the present invention.
Figure 4:
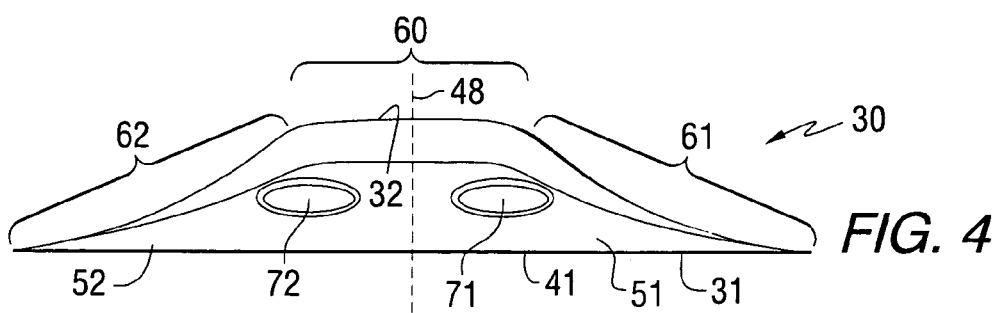
FIG. 4 is a front view of the block of material showing the first edge.

With reference to FIGS. 2–4, the block of material 30 has a first major surface 31 and a second major surface 32. The first major surface 31 is disposed in contact with a surface of the second generally semicircular half 22 of the throttle plate 12. The second major surface 32 extends away from the surface of the second semicircular half 22 of the throttle plate. As can be seen in FIGS. 2–4, the first major surface 31 is generally flat while the second major surface 32 is contoured in a particular way which will be described below.

The block of material 30 has a first edge 41 which is generally formed in the shape of an arc of a circle. It also comprises a second edge 42 which circumscribes the first major surface 31 in combination with the first edge 41. The first edge 41 is disposed in contact with the second generally semicircular half 22 of the throttle plate 12 proximate a generally semicircular perimeter 44 of the throttle plate 12 as shown in FIG. 1. The block of material 30 is generally symmetrical about a plane 48 which is generally perpendicular to the pivot axis 16. The plane 48 and its relationship to the pivot axis 16 is illustrated in FIG. 1. The plane 48 divides the block of material 30 into a first side 51 and a second side 52.

With continued reference to FIGS. 1–4, the block of material has a central region 60 of the second major surface 32 which is disposed between first and second distal regions, 61 and 62, of the second major surface 32. The thickness of the first and second distal regions, 61 and 62, as measured between the first and second major surfaces, 31 and 32, decreases as a function of the distance from the central region 60.

The thickness of the central region 60, as measured between the first and second major surfaces, 31 and 32, decreases as a function of the distance from the first edge 41 in a direction towards the second edge 42. This can be seen in FIG. 3 by comparing dimensions A and B. Dimension A represents the thickness of the central region 60 at a location toward the first edge 41. Dimension B represents the diminished thickness of the central region 60 measured at a location toward the second edge 42.

In certain embodiments of the present invention, a first hole 71 extends through the block of material 30 in a direction which is generally perpendicular to the pivot axis 16. A second hole 72 extends through the block of material 30 in a direction which is generally perpendicular to the pivot axis 16. The first hole 71 also extends through the first edge surface 78 which tapers away from the first edge 41. The second hole 72 also extends through the first edge surface 78 and through the second major surface 32.

The block of material 30, as shown in FIG. 1, is attached to an upstream surface of the throttle plate. In other words, air traveling through the cylindrical conduit of the throttle plate 14 passes downwardly into the page of FIG. 1.

The first and second distal regions, 61 and 62, of the second major surface 32 are each generally hyperbolic in shape in order to decrease the thickness of the first and second distal regions, 61 and 62, as a generally hyperbolic function, as measured between the first and second major surfaces, 31 and 32, decreasing as a function of the distance from the central region 60.

Figure 5:
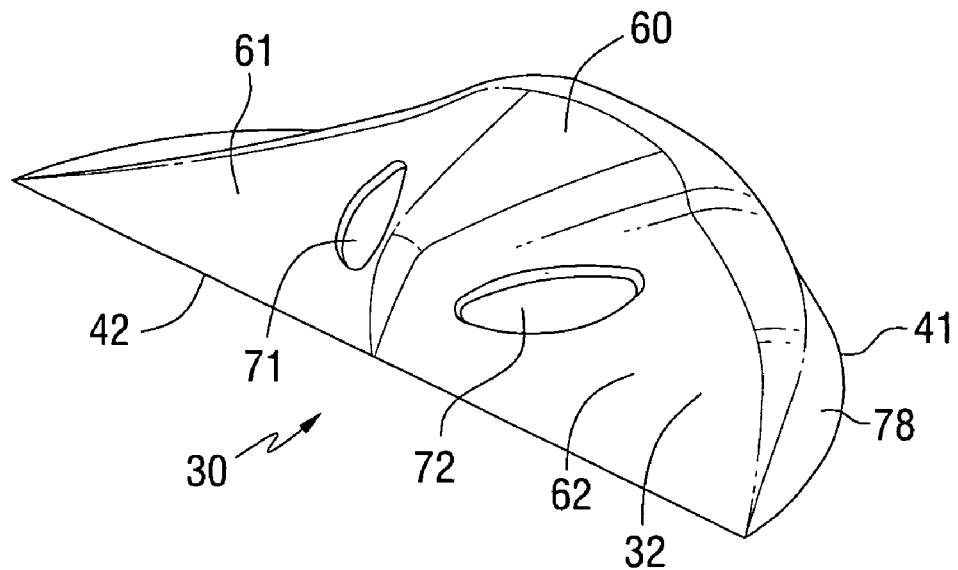
FIGS. 5 and 6 are two isometric views of the block of material of the present invention.
Figure 6:
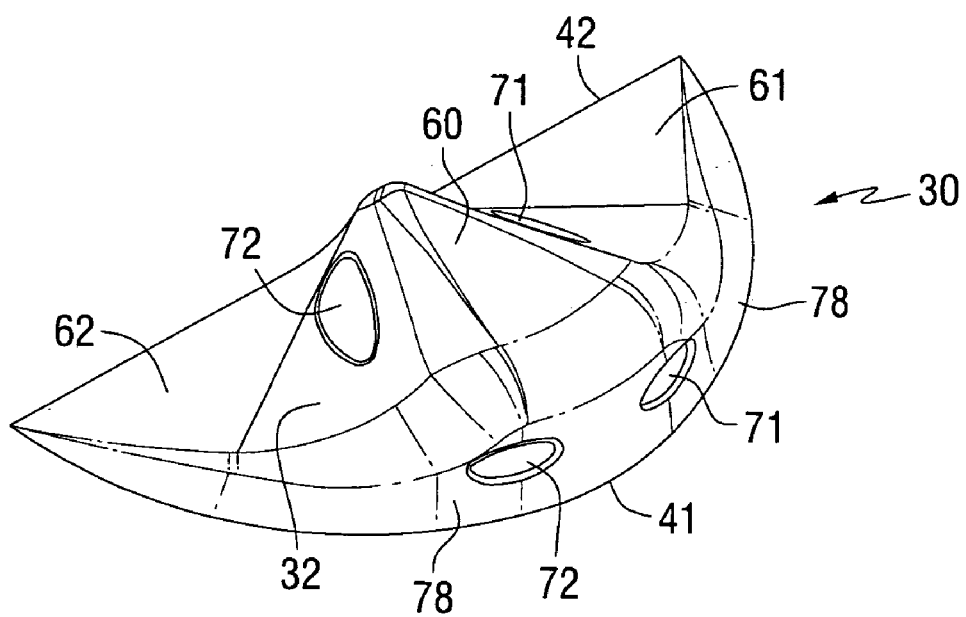

FIGS. 5 and 6 are two isometric views of the block of material 30 taken from two different directions. The block of material 30, as described above in conjunction with FIGS. 1–4, has a first major surface 31 (not visible in FIGS. 5 and 6) and a second major surface 32. The first major surface 31 is disposed in contact with a surface of the second generally semicircular half 22 of the throttle plate 12 and a second major surface 32 extends away from the surface of the 5 second generally semicircular half 22 of the throttle plate 12. The block of material 30 has a first edge 41 formed in the shape of an arc of a circle and a second edge 42 which circumscribes the first major surface 31 in combination with the first edge 41. The first edge 41 is disposed in contact with the second generally semicircular half 22 of the throttle plate 12 proximate a generally semicircular perimeter 44 of the throttle plate 12, as described above in conjunction with FIG. 1. The block of material 30 is generally symmetrical about a plane 48 which is generally perpendicular to the pivot axis 16. The plane 48 generally divides the block of material 30 into a first side 51 and a second side 52, as described above in conjunction with FIGS. 2 and 4. The block of material 30 has a central region 60 of the second major surface 32 which is disposed between the first and second distal regions, 61 and 62. The thickness of the first and second distal regions, 61 and 62, as measured between the first and second major surfaces, 31 and 32, decreases as a function of the distance from the central region. With reference to FIGS. 4–6, it can be seen that the first and second distal regions, 61 and 62, taper hyperbolically so that at the extreme end of the first and second edges, 41 and 42, the thickness of the block of material 30 is essentially a point. The thickness of the central region 60, as measured between the first and second major surfaces, 31 and 32, decreases as a function of the distance from the first edge 41 in a direction toward the second edge 42. This is illustrated in FIG. 3. First and second holes, 71 and 72, extend through the block of material 30 in a direction which is generally perpendicular to the pivot axis 16. The first and second holes, 71 and 72, extend through the first edge surface 78 and through the second major surface 32. This is best shown in FIG. 6. The first and second holes, 71 and 72, are symmetrically located relative to the plane 48. The block of material is attached to an upstream surface of the throttle plate.

The first and second distal regions, 0.61 and 62, of the second major surface 32 are each generally hyperbolic in shape in order to decrease the thickness of the first and second distal regions, 61 and 62, as a generally hyperbolic function, as measured between the first and second major surfaces, 31 and 32, decreasing as a function of the distance from the central region 60.

The shape of the block of material 30 is formed in order to direct air around the perimeter 44 of the throttle plate 12 in such a way that noise emanating from that region is reduced. Many different shapes, such as the one generally shown in U.S. patent application Ser. No. 10/104,232 have been tried and tested. Most shapes have some minimal effect on sound level emanating from the throttle plate region, but a shape generally in conformance with the block of material 30 described above in conjunction with FIGS. 1–6 maximizes the sound reduction. The use of a block of material attached to the inner cylindrical wall of the throttle body, such as that which is described in U.S. patent application Ser. No. 10/256,291, has also been tried and found to be less efficient in sound reduction than a block of material attached to an upstream surface of the throttle plate and formed in the manner described above in conjunction with FIGS. 1–6.

Although the present invention has been described in particular detail and illustrated to show a preferred embodiment, it should be understood that alternative embodiments are also within its scope. As an example, the holes, 71 and 72, are not necessary in every embodiment of the present invention. Similarly, the change in thickness measured along the central region 60 need not have the slope illustrated in the figures. Changes in this slope are also within the scope of the present invention. Similarly, the first and second distal regions, 61 and 62, need not be perfectly hyperbolic in shape in order to achieve the reduction in sound emanating from the region of the throttle plate 12.

We claim:

1. A throttle body assembly, comprising:

a throttle plate supported by a generally cylindrical throttle body conduit for rotation about a pivot axis, said throttle plate being rotatable into a plurality of partially opened positions to allow airflow through said throttle body assembly and into a generally closed position to inhibit air flow through said throttle body assembly, said throttle plate having a first generally semicircular half at a first side of said pivot axis and a second generally semicircular half at a second side of said pivot axis, said first generally semicircular half being rotatable toward an upstream side of said throttle body assembly to place said throttle plate in one of said plurality of partially opened positions, said second generally semicircular half being rotatable toward a downstream side of said throttle body assembly; and a block of material attached to said second generally semicircular half of said throttle plate, said block of material having a first major surface and a second major surface, said first major surface being disposed in contact with a surface of said second generally semicircular half of said throttle plate, said second major surface extending away from said surface of said second generally semicircular half of said throttle plate, said block of material having a first edge formed in the shape of an arc of a circle and a second edge which circumscribes said first major surface in combination with said first edge, said first edge being disposed in contact with said second generally semicircular half of said throttle plate proximate a generally semicircular perimeter of said throttle plate, said block of material being generally symmetrical about a plane which is generally perpendicular to said pivot axis, said plane dividing said block of material into a first side and a second side, said block of material having a central region of said second major surface disposed between first and second distal regions of said second major surface, the thickness of said first and second distal regions, as measured between said first and second major surfaces, decreasing as a function of the distance from said central region, and a first hole extending through said block of material in a direction which is generally perpendicular to said pivot axis.

2. The throttle body assembly of claim 1, wherein:
the thickness of said central region, as measured between said first and second major surfaces, decreases as a function of the distance from said first edge in a direction toward said second edge.

3. The throttle body assembly of claim 1, wherein:
a second hole extends through said block of material in a direction which is generally perpendicular to said pivot axis.

4. The throttle body assembly of claim 3, wherein:
said second hole extends through a first edge surface extending from said first edge.

5. The throttle body assembly of claim 3, wherein:
said second hole extends through said second major surface.

6. The throttle body assembly of claim 3, wherein:
said first and second holes are symmetrically located relative to said plane.

7. The throttle body assembly of claim 1, wherein:
said first hole extends through a first edge surface extending from said first edge.

8. The throttle body assembly of claim 1, wherein:
said first hole extending through said second major surface.

9. The throttle body assembly of claim 1, wherein:
said first and second distal regions of said second major surface are each generally hyperbolic in shape to decrease said thickness of said first and second distal regions as a generally hyperbolic function, as measured between said first and second major surfaces, decreasing as a function of the distance from said central region.

10. The throttle body assembly of claim 1, wherein: said block of material being attached to an upstream surface of said throttle plate.

11. A throttle body assembly, comprising:
a throttle plate supported by a generally cylindrical throttle body conduit for rotation about a pivot axis, said throttle plate being rotatable into a plurality of partially opened positions to allow airflow through said throttle body assembly and into a generally closed position to inhibit air flow through said throttle body assembly, said throttle plate having a first generally semicircular half at a first side of said pivot axis and a second generally semicircular half at a second side of said pivot axis, said first generally semicircular half being rotatable toward an upstream side of said throttle body assembly to place said throttle plate in one of said plurality of partially opened positions, said second generally semicircular half being rotatable toward a downstream side of said throttle body assembly; and
a block of material attached to said second generally semicircular half of said throttle plate on an upstream surface of said throttle plate, said block of material having a first major surface and a second major surface, said first major surface being disposed in contact with a surface of said second generally semicircular half of said throttle plate, said second major surface extending away from said surface of said second generally semicircular half of said throttle plate, said block of material having a first edge formed in the shape of an arc of a circle and a second edge which circumscribes said first major surface in combination with said first edge, said first edge being disposed in contact with said second generally semicircular half of said throttle plate proximate a generally semicircular perimeter of said throttle plate, said block of material being generally symmetrical about a plane which is generally perpendicular to said pivot axis, said plane dividing said block of material into a first side and a second side, said block of material having a central region of said second major surface disposed between first and second distal regions of said second major surface, the thickness of said first and second distal regions, as measured between said first and second major surfaces, decreasing as a function of the distance from said central region, the thickness of said central region, as measured between said first and second major surfaces, decreasing as a function of the distance from said first edge in a direction toward said second edge, a first hole extending through said block of material in a direction which is generally perpendicular to said pivot axis, a second hole extending through said block of material in a direction which is generally perpendicular to said pivot axis.

12. The throttle body assembly of claim 11, wherein:
said first hole extends through a first edge surface extending from said first edge and said second major surface; and
said second hole extends through a first edge surface extending from said first edge and said second major surface.

13. The throttle body assembly of claim 12, wherein:
said first and second holes are symmetrically located relative to said plane.

14. The throttle body assembly of claim 11, wherein:
said first and second distal regions of said second major surface are each generally hyperbolic in shape to decrease said thickness of said first and second distal regions as a generally hyperbolic function, as measured between said first and second major surfaces, decreasing as a function of the distance from said central region.

15. A throttle body assembly, comprising:
a throttle plate supported by a generally cylindrical throttle body conduit for rotation about a pivot axis, said throttle plate being rotatable into a plurality of partially opened positions to allow airflow through said throttle body assembly and into a generally closed position to inhibit air flow through said throttle body assembly, said throttle plate having a first generally semicircular half at a first side of said pivot axis and a second generally semicircular half at a second side of said pivot axis, said first generally semicircular half being rotatable toward an upstream side of said throttle body assembly to place said throttle plate in one of said plurality of partially opened positions, said second generally semicircular half being rotatable toward a downstream side of said throttle body assembly; and
a block of material attached to said second generally semicircular half of said throttle plate on an upstream surface of said throttle plate, said block of material having a first major surface and a second major surface, said first major surface being disposed in contact with a surface of said second generally semicircular half of said throttle plate, said second major surface extending away from said surface of said second generally semicircular half of said throttle plate, said block of material having a first edge formed in the shape of an arc of a circle and a second edge which circumscribes said first major surface in combination with said first edge, said first edge being disposed in contact with said second generally semicircular half of said throttle plate proximate a generally semicircular perimeter of said throttle plate, said block of material being generally symmetrical about a plane which is generally perpendicular to said pivot axis, said plane dividing said block of material into a first side and a second side, said block of material having a central region of said second major surface disposed between first and second distal regions of said second major surface, the thickness of said first and second distal regions, as measured between said first and second major surfaces, decreasing as a function of the distance from said central region, the thickness of said central region, as measured between said first and second major surfaces, decreasing as a function of the distance from said first edge in a direction toward said second edge, said first and second distal regions of said second major surface being each generally hyperbolic in shape to decrease said thickness of said first and second distal regions as a generally hyperbolic function, as measured between said first and second major surfaces, decreasing as a function of the distance from said central region.

16. The throttle body assembly of claim 15, wherein:

a first hole extends through said block of material in a direction which is generally perpendicular to said pivot axis; and a second hole extends through said block of material in a direction which is generally perpendicular to said pivot axis.

17. The throttle body assembly of claim 16, wherein:

said first hole extends through a first edge surface extending from said first edge and said second major surface; and said second hole extends through a first edge surface extending from said first edge and said second major surface.

18. The throttle body assembly of claim 17, wherein:

said first and second holes are symmetrically located relative to said plane.

* * * * *